(12) United States Patent
Maiterth et al.

(10) Patent No.: US 11,945,422 B2
(45) Date of Patent: Apr. 2, 2024

(54) PRESSURE SENSOR FOR A BRAKE BOOSTER

(71) Applicant: Robert Bosch GmbH, Stuttgart (DE)

(72) Inventors: Eduard Maiterth, Heilbronn (DE);
Carlos Nascimento, Heilbronn (DE);
Masaya Eto, Untergruppenbach (DE);
Klaus Burkhardt, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 880 days.

(21) Appl. No.: 16/971,087

(22) PCT Filed: Feb. 14, 2019

(86) PCT No.: PCT/EP2019/053608
§ 371 (c)(1),
(2) Date: Aug. 19, 2020

(87) PCT Pub. No.: WO2019/166225
PCT Pub. Date: Sep. 6, 2019

(65) Prior Publication Data
US 2021/0094528 A1    Apr. 1, 2021

(30) Foreign Application Priority Data

Mar. 1, 2018   (DE) .................. 10 2018 203 031.6

(51) Int. Cl.
*B60T 17/22*  (2006.01)
*B60T 13/57*  (2006.01)
(Continued)

(52) U.S. Cl.
CPC ............ *B60T 17/221* (2013.01); *B60T 13/57* (2013.01); *B60T 17/04* (2013.01); *G01L 19/0038* (2013.01); *G01L 19/14* (2013.01)

(58) Field of Classification Search
None
See application file for complete search history.

(56) References Cited

U.S. PATENT DOCUMENTS

| 2010/0064815 A1 | 3/2010 | Vogler |
| 2016/0178474 A1 | 6/2016 | Spanevello |

FOREIGN PATENT DOCUMENTS

| CN | 101191752 A | 6/2008 |
| CN | 103 398 819 A | 11/2013 |

(Continued)

OTHER PUBLICATIONS

International Search Report corresponding to PCT Application No. PCT/EP2019/053608, dated May 14, 2019 (German and English language document) (5 pages).

*Primary Examiner* — Daniel S Larkin
(74) *Attorney, Agent, or Firm* — Maginot, Moore & Beck LLP

(57) ABSTRACT

A pressure sensor for a brake booster includes a housing that receives a pressure sensor element and which has a first fluid connection, via which the pressure sensor can be connected to the brake booster. The housing has a second fluid connection with a receiving opening which at least partly receives a flow valve and a connection socket for a vacuum pump, wherein the flow valve releases the flow of fluid in the direction of the vacuum pump and blocks the flow of fluid in the opposite direction. The flow valve is designed as a membrane insert and is inserted into the receiving opening.

9 Claims, 4 Drawing Sheets

(51) Int. Cl.
*B60T 17/04* (2006.01)
*G01L 19/00* (2006.01)
*G01L 19/14* (2006.01)

(56) References Cited

FOREIGN PATENT DOCUMENTS

| | | | |
|---|---|---|---|
| CN | 105699005 A | | 6/2016 |
| CN | 206691106 U | * | 12/2017 |
| DE | 10 2006 056 242 A1 | | 5/2008 |
| JP | H06-151894 A | | 5/1994 |
| JP | 2006-329192 A | | 12/2006 |
| JP | 2007-62729 A | | 3/2007 |
| JP | 2008-134251 A | | 6/2008 |
| JP | 2013-502537 A | | 1/2013 |
| JP | 2017-171297 A | | 9/2017 |

* cited by examiner

PRESSURE SENSOR FOR A BRAKE BOOSTER

This application is a 35 U.S.C. § 371 National Stage Application of PCT/EP2019/053608, filed on Feb. 14, 2019, which claims the benefit of priority to Serial No. DE 10 2018 203 031.6, filed on Mar. 1, 2018 in Germany, the disclosures of which are incorporated herein by reference in their entirety.

The disclosure starts from a pressure sensor for a brake booster.

BACKGROUND

There are known from the prior art low-pressure sensors which measure a low pressure in an associated brake booster and transmit a corresponding signal to a control device. In order to generate a vacuum in the brake booster, a low pressure is generally generated via a vacuum pump and a flow valve. The function of the flow valve is on the one hand to allow aspiration of the air from the brake booster and furthermore, when the operation of aspiration is complete, to maintain the vacuum in the brake booster for as long as possible. Solutions are known from the prior art in which the pressure sensor and the flow valve are each connected to the brake booster by means of an adapter. In these solutions, a sealing geometry of the flow valve can be optimized and produced from unreinforced plastics material, so that a relatively good surface quality can be achieved, which leads to good long-term sealing properties.

SUMMARY

The pressure sensor for a brake booster having the features disclosed herein has the advantage that the flow valve is integrated in the pressure sensor without impairing the sealing properties of the flow valve. By means of the flow valve in the form of a membrane insert which is manufactured from unreinforced plastics material and integrated in the pressure sensor, it is possible, with a smaller space requirement and a lower outlay in terms of assembly, to achieve similar long-term sealing properties as in the solution known from the prior art in which the pressure sensor and the flow valve are each connected to the brake booster by means of an adapter.

Embodiments of the present invention disclosure provide a pressure sensor for a brake booster having a housing which receives a pressure sensor element and has a first fluid connection via which the pressure sensor can be connected to the brake booster. The housing has a second fluid connection with a receiving opening which at least partially receives a flow valve and a connecting piece for a vacuum pump, wherein the flow valve releases a flow of fluid in the direction towards the vacuum pump and blocks a flow of fluid in the opposite direction. The flow valve is in the form of a membrane insert and is inserted into the receiving opening.

By means of the measures and further developments described below, advantageous improvements to the pressure sensor for a brake booster are possible.

It is particularly advantageous that the membrane insert can comprise a membrane with a disk-shaped base body and a membrane receiver with a sealing geometry. The disk-shaped base body of the membrane can have a central opening via which the membrane can be fitted onto a receiving pin of the membrane receiver and can lie against the sealing geometry. In addition, at least one through-opening can be introduced into the sealing geometry, wherein the membrane can cover the at least one through-opening completely in the blocking state and release it at least partially in the released state. Via the flow valve in the form of a membrane insert, the vacuum pump can generate a low pressure in the brake booster, which can be measured by the pressure sensor element. The flow valve thus allows air to be aspirated from the brake booster via the at least one through-opening and maintains the vacuum generated in the brake booster for as long as possible.

In an advantageous embodiment of the pressure sensor, the membrane insert can be sealed axially and/or radially against a wall of the receiving opening. This means that the receiving opening is so formed that it is possible to mount the membrane insert in a fluid-tight manner.

In a further advantageous embodiment of the pressure sensor, the membrane insert can be connected to the wall of the receiving opening by means of a fluid-tight connecting technique. The membrane insert can thus be permanently connected in a fluid-tight manner to the wall of the receiving opening in the housing by, for example, seal welding, sealing/bonding, etc. In addition or alternatively, a sealing lip can be arranged on the membrane insert, which sealing lip can seal the membrane insert against the wall of the receiving opening. The sealing lip can, for example, be molded onto the membrane insert.

In a further advantageous embodiment of the pressure sensor, a sealing element can additionally or alternatively be arranged between the membrane insert and the wall of the receiving opening in a receiving groove, which sealing element can seal the membrane insert against the wall of the receiving opening. The sealing element can be in the form of, for example, an O-ring which is guided in the receiving groove. The receiving groove can thereby be introduced completely into the membrane insert. Alternatively, the receiving groove can be formed in part by the membrane insert and in part by the wall of the receiving opening.

In a further advantageous form of the pressure sensor, the connecting piece for the vacuum pump can close the receiving opening in a fluid-tight manner. This means that the connecting piece for the vacuum pump is arranged in the receiving opening downstream of the flow valve and closes the receiving opening and at the same time establishes a fluidic connection with the vacuum pump.

Exemplary embodiments of the disclosure are shown in the drawing and will be described in greater detail in the following description. In the drawing, the same reference numerals denote components or elements which perform the same or analogous functions.

DETAILED DESCRIPTION

Figure 1:
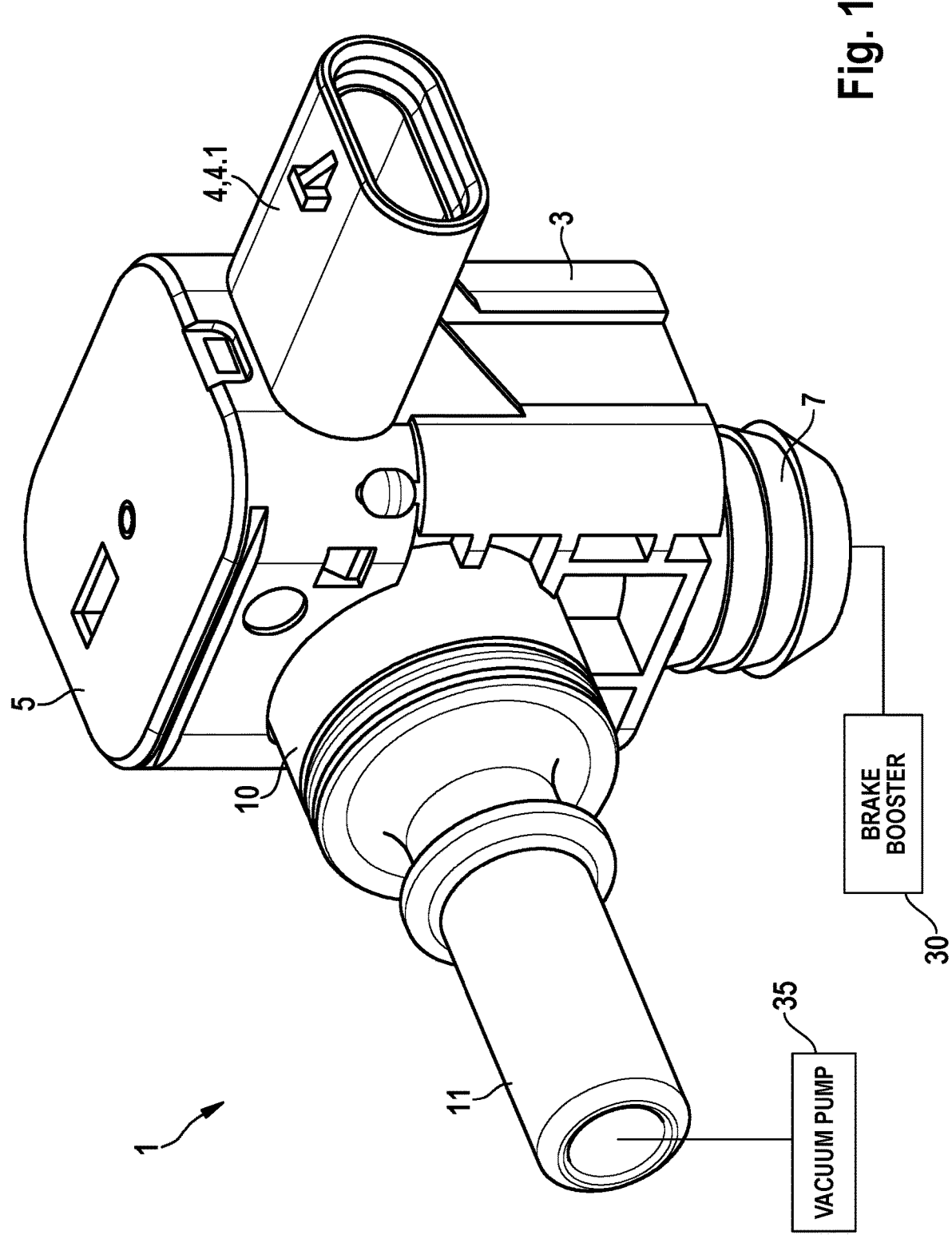
FIG. 1 shows a schematic perspective representation of a first exemplary embodiment of a pressure sensor according to the disclosure for a brake booster.
Figure 2:
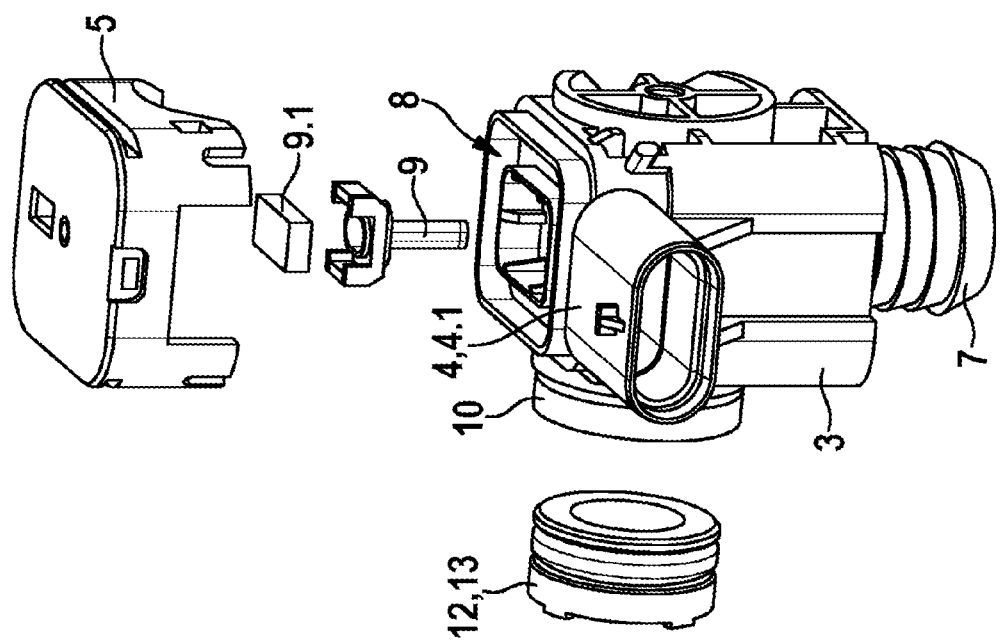
FIG. 2 shows a schematic perspective exploded representation of the pressure sensor according to the disclosure for a brake booster of FIG. 1.
Figure 2:
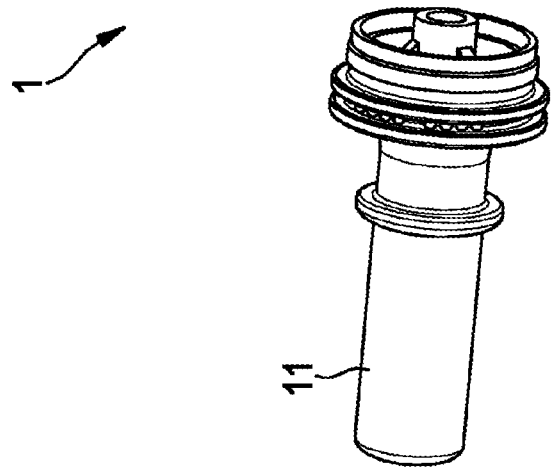

As is apparent from FIGS. 1 to 6, the exemplary embodiments shown of the pressure sensor 1 according to the invention for a brake booster in each case comprises a housing 3, 3A which receives a pressure sensor element 9.1 and has a first fluid connection 7. Via the first fluid connection 7, the pressure sensor 1 can be fluidically connected to the brake booster 30. The housing 3, 3A has a second fluid connection 10, 10A with a receiving opening 10.1, 10.1A which at least partially receives a flow valve 12 and a connecting piece 11 for a vacuum pump 35. The flow valve 12 releases a flow of fluid in the direction towards the vacuum pump 35 and blocks a flow of fluid in the opposite direction. In addition, the flow valve 12 is in the form of a membrane insert 13, 13A and is inserted into the receiving opening 10.1, 10.1A.

As is further apparent from FIGS. 1 to 6, the first fluid connection 7 is in the form of a connecting piece which is integrated directly in the housing 3, 3A of the pressure sensor 1. Via the first fluid connection 7 in the form of a connecting piece, the pressure sensor 1 can be pressed into a corresponding receiving opening, not shown, in the brake booster or caulked therewith. As is further apparent from FIGS. 1 to 6, the housing 3, 3A of the pressure sensor has at an opposite end to the first fluid connection 7 a sensor receiver 8 which receives a sensor holder 9 with the pressure sensor element 9.1. A cover 5 closes the sensor receiver 8 and this end of the housing 3, 3A. The pressure sensor 1 additionally has an electrical connection 4 which is molded in the form of a plug socket 4.1 on the housing 3, 3A. Inside the plug socket 4.1 there are arranged contact pins, not visible, which are electrically connected to the pressure sensor element 9.1 and are contactable via a plug inserted into the plug socket 4.1. Via the plug, a data signal of the pressure sensor element 9.1 can be tapped and transmitted to a control device.

As is further apparent from FIGS. 1 to 6, the receiving opening 10.1, 10.1A of the second fluid connection 10, 10A is arranged perpendicularly to the first fluid connection 7. In addition, the connecting piece 11 closes the receiving opening 10.1, 10.1A in a fluid-tight manner. The connecting piece 11 of the second fluid connection 10, 10A can, for example, be pressed into the receiving opening 10.1, 10.1A or caulked with the receiving opening 10.1, 10.1A.

As is further apparent from FIGS. 3 to 6, the membrane insert 13, 13A in the exemplary embodiments shown comprises a membrane 14 with a disk-shaped base body and a membrane receiver 16, 16A with a sealing geometry 16.1. The disk-shaped base body of the membrane 14 has a central opening via which the membrane is fitted onto a receiving pin 16.2 of the membrane receiver 16, 16A. The sealing geometry 16.1 is inwardly curved and has multiple through-openings 16.3. In the blocking state, the membrane 14 lies in a biased manner against the curved sealing geometry 16.1 and covers the through-openings 16.3 completely. In the released state, at least the edge region 15 of the membrane 14 is lifted from the sealing geometry 16.1, so that the through-openings 16.3 are at least partially released and fluid or air can be aspirated from the brake booster via the flow valve 12 in the direction towards the vacuum pump. After the vacuum pump has been switched off, the low pressure generated in the brake booster draws the membrane 14 in, so that it lies against the sealing geometry 16.1 in a sealing manner.

The membrane insert 13, 13A can be sealed axially and/or radially against a wall of the receiving opening 10.1, 10.1A. The membrane insert 13, 13A can thus be connected to the wall of the receiving opening 10.1, 10.1A by means of a fluid-tight connecting technique, for example. In addition or alternatively, a sealing lip can be arranged on the membrane insert 13, 13A, which sealing lip seals the membrane insert 13, 13A against the wall of the receiving opening 10.1, 10.1A.

As is further apparent from FIGS. 3 to 6, in the exemplary embodiments shown a sealing element 19 is arranged between the membrane insert 13, 13A and a wall of the receiving opening 10.1, 10.1A in a receiving groove 18, 18A, which sealing element seals the membrane insert 13, 13A against the wall of the receiving opening 10.1, 10.1A. In the exemplary embodiments shown, the membrane insert 13, 13A is sealed with respect to the housing 3, 3A by, for example, an O-ring as the sealing element. Furthermore, in addition to the radial sealing by the sealing element 19 in the form of an O-ring, axial sealing can also be provided.

Figure 3:
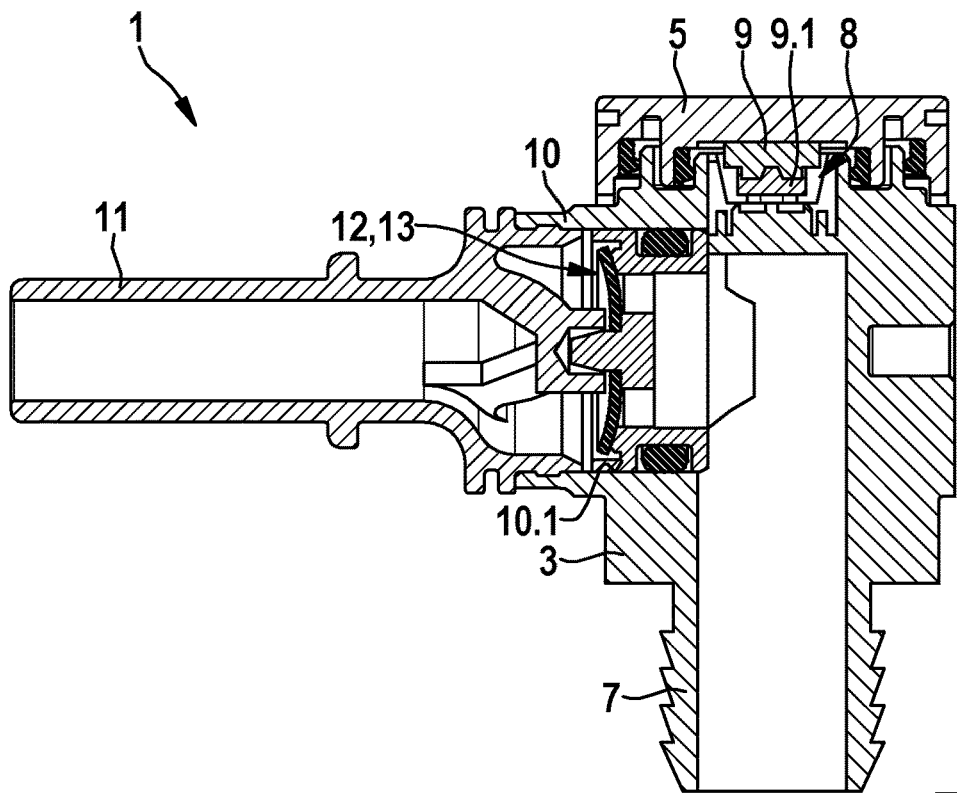
FIG. 3 shows a sectional representation of the pressure sensor according to the invention for a brake booster of FIGS. 1 and 2.
Figure 4:
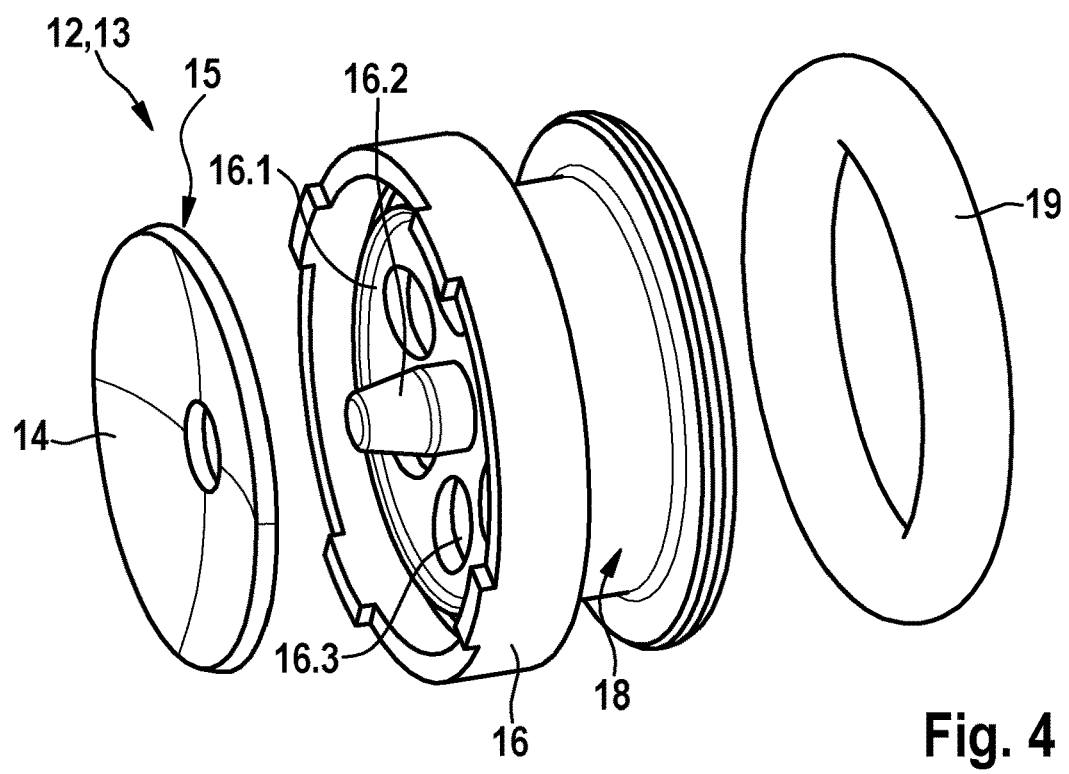
FIG. 4 shows a schematic perspective exploded representation of a first exemplary embodiment of a membrane insert of the pressure sensor according to the invention for a brake booster of FIGS. 1 to 3.
Figure 5:
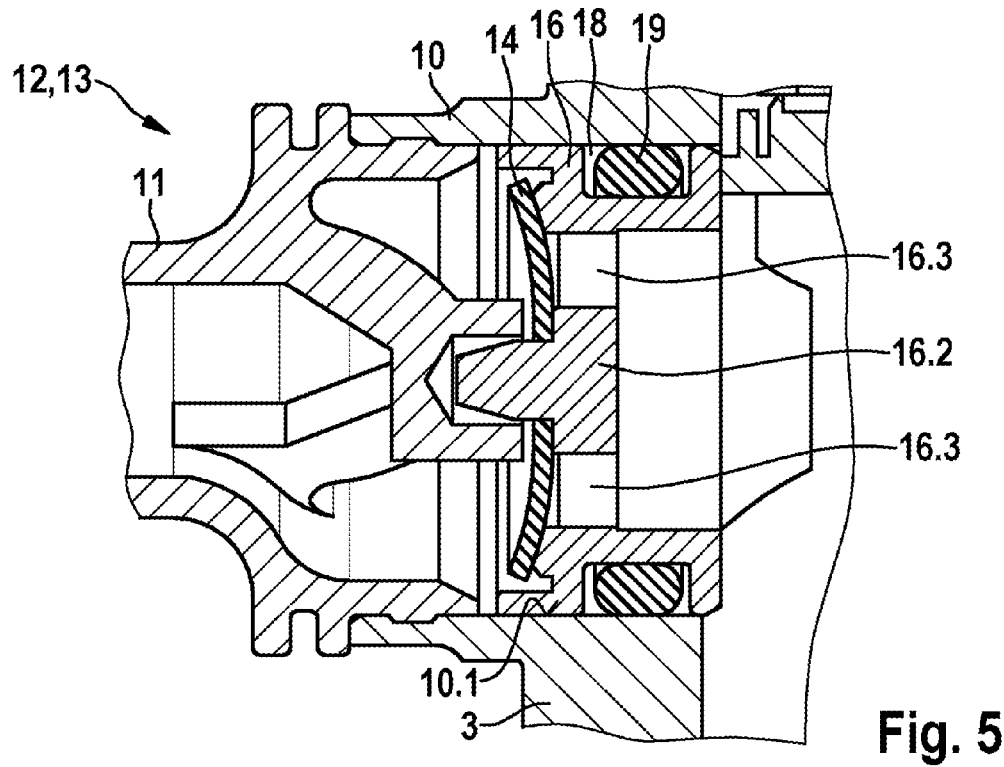
FIG. 5 shows a sectional representation of a second fluid connection of the pressure sensor according to the invention for a brake booster of FIGS. 1 to 3 with the membrane insert of FIG. 4.

As is further apparent from FIGS. 3 to 5, the receiving groove 18 in the exemplary embodiment shown is introduced completely into the membrane insert 13.

Figure 6:
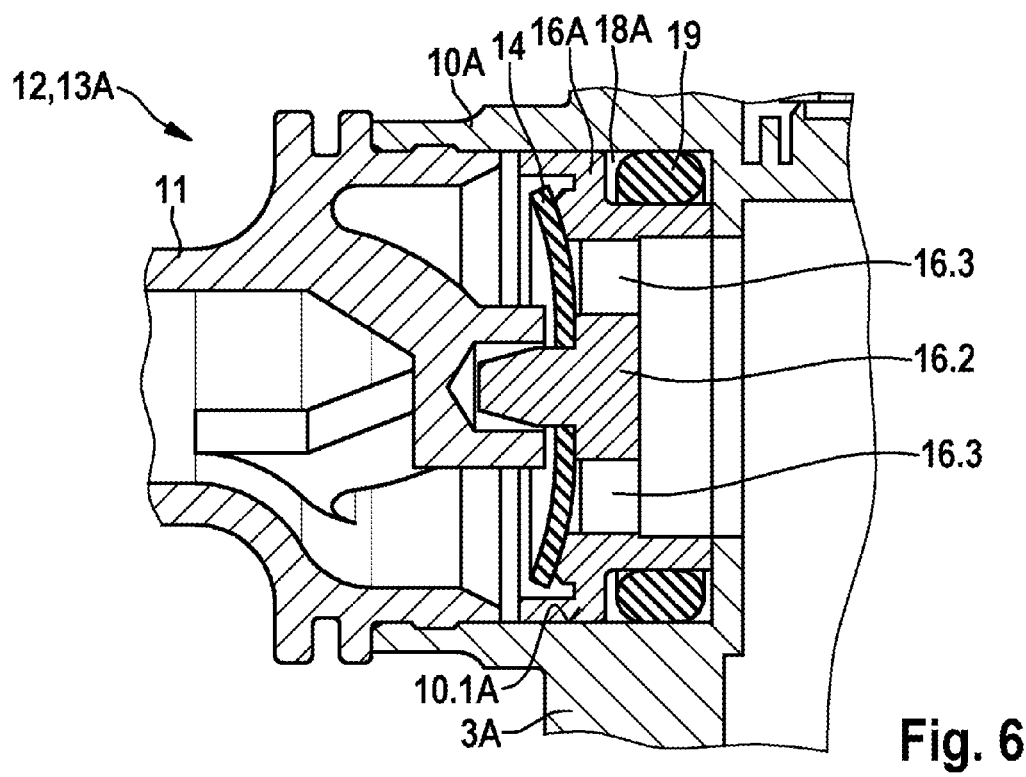
FIG. 6 shows a sectional representation of a second fluid connection of a pressure sensor according to the disclosure for a brake booster with a second exemplary embodiment of a membrane insert.

As is further apparent from FIG. 6, the receiving groove 18A in the exemplary embodiment shown is formed in part by the membrane insert 13A and in part by the wall of the receiving opening 10.1A.

The housing 3, 3A and the cover 5 of the pressure sensor 1 are preferably in the form of injection-molded parts with overmolded contact pins. The pressure sensor element 9.1 is fluidically connected to a pressure space which is formed within the housing 3, 3A and which merges at the bottom into the first fluid connection 7 and at the side into the second fluid connection 10, 10A. The housing 3, 3A is so formed that it is possible to mount the membrane insert 13, 13A in a fluid-tight manner.

The invention claimed is:

1. The A pressure sensor for a brake booster, comprising:
a pressure sensor element;
a housing which receives the pressure sensor element, the housing comprising:
 a first fluid connection configured to connect the pressure sensor to the brake booster; and
 a second fluid connection defining a receiving opening which at least partially receives a flow valve and a connecting piece for a vacuum pump,
wherein the flow valve releases a flow of fluid in a first direction towards the vacuum pump and blocks the flow of fluid in a second opposite direction, and
wherein the flow valve is configured as a membrane insert and is inserted into the receiving opening, the membrane insert comprising:
 a membrane having a disk-shaped base body; and
 a membrane receiver with a sealing geometry.
2. The pressure sensor as claimed in claim 1, wherein:
the disk-shaped base body of the membrane defines a central opening via which the membrane is fitted onto a receiving pin of the membrane receiver and lies against the sealing geometry;

at least one through-opening is introduced into the sealing geometry; and the membrane covers the at least one through-opening completely in a blocking state and at least partially releases the at least one through-opening in a released state.

3. The pressure sensor as claimed in claim 1, wherein the membrane insert is sealed axially and/or radially against a wall of the receiving opening.

4. The pressure sensor as claimed in claim 3, wherein the membrane insert is connected to the wall of the receiving opening by a fluid-tight connecting technique.

5. The pressure sensor as claimed in claim 3, wherein the membrane insert includes a sealing lip arranged on the membrane insert and configured to seal the membrane insert against the wall of the receiving opening.

6. The pressure sensor as claimed in claim 3, further comprising:

a sealing element arranged between the membrane insert and the wall of the receiving opening in a receiving groove, the sealing element sealing the membrane insert against the wall of the receiving opening.

7. The pressure sensor as claimed in claim 6, wherein the receiving groove is introduced completely into the membrane insert.

8. The pressure sensor as claimed in claim 6, wherein the receiving groove is formed in part by the membrane insert and in part by the wall of the receiving opening.

9. The pressure sensor as claimed in claim 1, wherein the connecting piece closes the receiving opening in a fluid-tight manner.

* * * * *